Sept. 5, 1972  D. A. HAUSMANN  3,689,305
COMPOSITION AND METHOD FOR SEALING MORTAR-COATED PIPE
Filed June 19, 1969
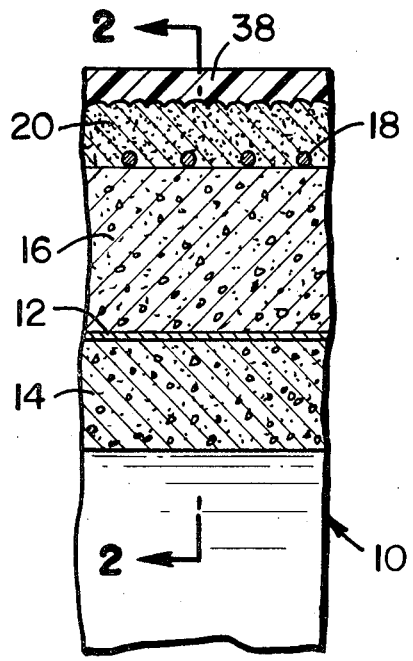
FIG_1
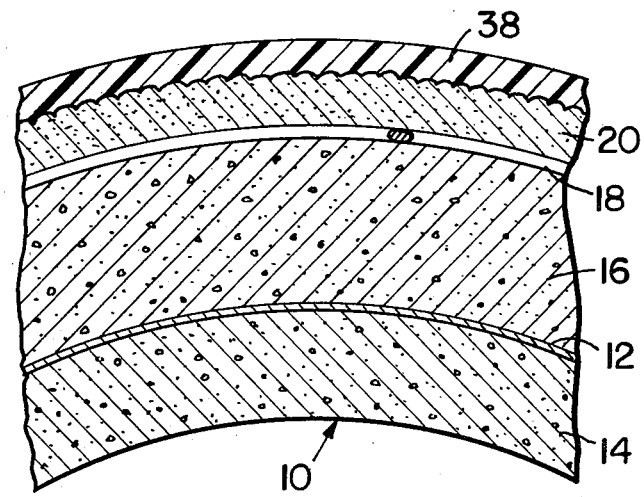
FIG_2
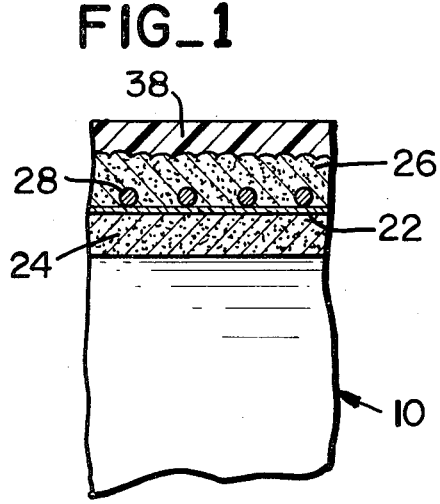
FIG_3
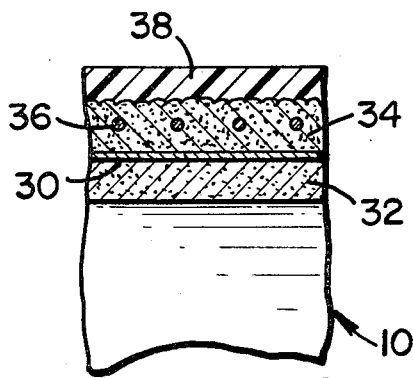
FIG_4
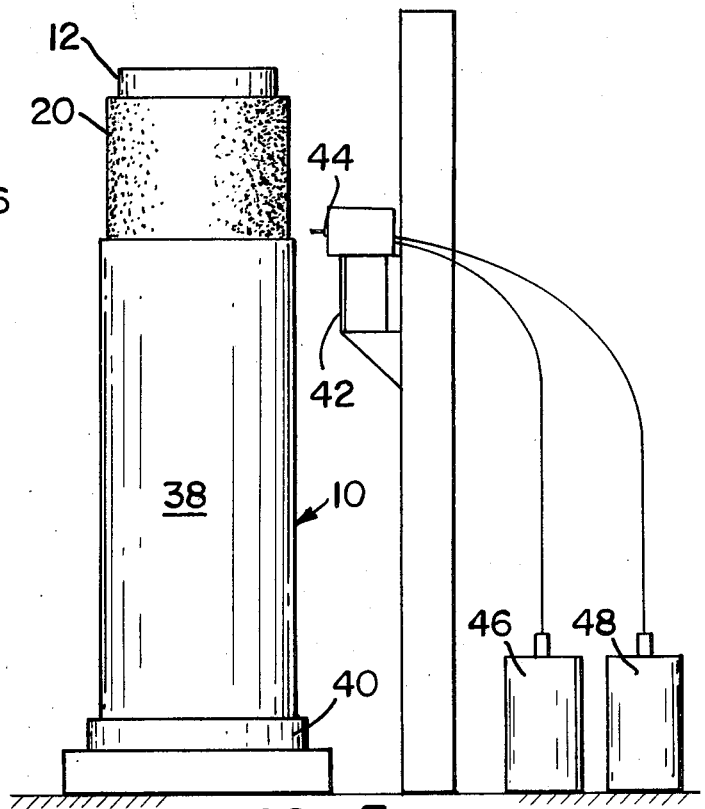
FIG_5
INVENTOR.
DELBERT A. HAUSMANN
BY
Mellin, Moore & Weissenberger
ATTORNEYS

United States Patent Office 3,689,305
Patented Sept. 5, 1972

3,689,305
COMPOSITION AND METHOD FOR SEALING MORTAR-COATED PIPE
Delbert A. Hausmann, Glendale, Calif., assignor to American Pipe and Construction Co., Monterey Park, Calif.
Filed June 19, 1969, Ser. No. 834,734
Int. Cl. B44d 1/16
U.S. Cl. 117—70 C 4 Claims

ABSTRACT OF THE DISCLOSURE

A corrosion-preventing sealer coating can be applied to mortar-coated pipe without waiting for the mortar to cure if the sealer is a liquid, essentially solvent-free material of the proper flow characteristics to form a substantially pinhole-free, continuous layer over the irregularities of the rough mortar surface, and cures at room temperature into a hard, moisture-impervious coating by the use of a water-compatible, non-acid curing agent. A pigmented and thickened substantially solvent-free epoxy resin composition cured by an accelerated amido-amine curing agent is described as an example of a coating system which satisfies the above requirements.

BACKGROUND OF THE INVENTION

Pipe used for the conveyance of fresh and waste water commonly contains a steel cylinder and other steel elements which are susceptible to corrosion if the pipe is submerged in water or buried in moist soil containing certain chemicals, principally chlorides. Steel corrosion may also occur due to electrical discharge of current originating from external power sources such as electrified railways.

Corrosion is inhibited if all steel elements are encased in portland cement mortar. Alkalinity released by hydrating portland cement in the mortar forms a passivating oxide film which prevents steel corrosion. However, the passivating effect is eventually destroyed if chloride ions reach steel surfaces in high concentrations by penetration through interstices or cracks in the mortar encasement. Supplemental protection against corrosion is sometimes provided by means of galvanic or impressed-current cathodic protection systems, but such applications are costly and frequently difficult to apply.

A desirable solution to this problem would be a sealer coating over the mortar which would form a dielectric barrier impervious to water, oxygen and chloride ions. Sealer coatings of this type have been proposed in the prior art with limited success when applied to fresh cement mortar due to incompatibility with moisture in the mortar and release of solvents or acid components which prevent proper hydration of the mortar. Both conditions result in poor bond, making the surface coating susceptible to damage and disbonding. The release of solvents also produces pinholes in the sealer coating which defeat its intended purpose. Consequently, these prior art coatings, when effectively usable at all, had to be applied after the mortar had been fully cured under steam or water spray—a time-consuming, expensive and highly undesirable requirement from a production point of view.

SUMMARY OF THE INVENTION

The invention not only overcomes the problems of the prior art but also eliminates the time-consuming steam or water-spray curing of the mortar, by providing an epoxy sealer coating for cement mortar which not only reduces the permeability of the mortar to corrosive influences and stray current entry, but also acts as a curing membrane for the mortar itself, and which is therefore best applied over fresh, uncured mortar. Basically, the invention contemplates the use of an essentially, solventless system, (i.e. a system which contains either no solvents or solvents of such nature and in such quantity that they do not significantly interfere with the hydration of the mortar). This system is preferably a viscous liquid for application purposes and it cures rapidly at room temperature into a thin, hard, moisture-impervious layer that provides electrochemical and mechanical protection for the mortar and serves as a curing membrane to prevent water evaporation from the mortar surface. Mixing water retained in the mortar by the coating system is adequate for complete hydration of portland cement in the mortar. In fact, mortar cured in this manner has been shown to have a compressive strength substantially higher than that attainable by steam or water spray cure.

In order to produce a firm bond with the mortar surface, the system in its liquid form must be chemically-compatible with hydrating damp mortar surfaces. In addition, it must have flow characteristics that permit application by spraying or brushing to form a thick, continuous, substantially pinhole-free layer which follows irregularities of the mortar surface and adheres to vertical surfaces without sagging or running.

At the same time, the systems contemplated by this invention must be essentially solvent-free so that the presence of organic solvents will not interfere with bond formation or with the hydration of the mortar. Another requirement is that the system have no acid component which might interfere with the lime formation which occurs during hydration.

The cured sealer coating must, in order to protect the pipe against corrosion, penetrate surface interstices in the mortar for mechanical bond, be a good dielectric, be mechanically strong enough to retain its integrity under field conditions of use, and be impervious to moisture and to corrosive dissolved salts such as chlorides. The above-described criteria are met to a greater or lesser degree by any room-temperature curable solvent-free, alkaline-surface-compatible liquid with the required protective and application characteristics, e.g. polyamide cured epoxy resins, moisture cured urethanes, and polysulfides. However, the preferred embodiment of the invention envisions the use of epoxies which are curable at room temperature with curing agents of the amido-amine type.

Specifically, the invention in its preferred embodiment, contemplates the application, to uncured portland cement mortar, of a sealer coating consisting of a two-component essentially solvent-free epoxy resin system. The resin component of the system is a solvent-free liquid epoxy resin containing inert pigments or fillers, and inert organic or inorganic thickeners as may be required to provide the necessary viscosity for any given contemplated method of application. The curing agent component consists of chemically-modified amines, polyamides or mixtures thereof.

It is therefore the object of the invention to provide a combined, anti-corrosion sealer coating and curing membrane for mortar-coated steel-containing pipes.

It is another object of the invention to provide a sealer coating which can be applied to mortar-coated pipe while the mortar is fresh.

It is a further object of the invention to provide a sealer coating of the type described which has dielectric properties and is damage resistant and impervious to moisture and to chloride ions.

BRIEF DESCRIPTION OF THE DRAWINGS

FIG. 1 is a fragmentary longitudinal section of a prestressed concrete pipe made in accordance with the invention;

FIG. 2 is a fragmentary circumferential section of the pipe of FIG. 1;

FIG. 3 is a fragmentary longitudinal section of a concrete cylinder pipe made in accordance with the invention;

FIG. 4 is a like view of a steel pipe coated with steel-reinforced mortar and made in accordance with this in-invention; and FIG. 5 is an elevational view illustrating a preferred method of applying the sealer coating of this invention to a pipe.

DESCRIPTION OF THE PREFERRED EMBODIMENT

In FIGS. 1 and 2, the numeral 10 denotes a conventional prestressed cylinder pipe. The pipe 10 includes a steel cylinder core 12 to which the inner and outer structural concrete layers 14, 16 are applied. A steel prestressing wire 18 is wound under tension about the concrete layer 16 after it has set, and the thus prestressed concrete pipe is then encased in portland cement mortar 20 in a conventional manner.

The invention is equally applicable to other mortar-coated pipes 10, such as, e.g. steel cylinder pipes 22 (FIG. 3) with both an interior and exterior mortar coating 24, 26 and with or without steel reinforcing rods 28, or steel pipes 30 (FIG. 4) with or without an interior mortar lining 32 and with an exterior mortar coating 34 reinforced with steel rods, wire or fabric 36.

Immediately following the encasement (i.e. within about one hour), a layer 38 of the resin sealer of this invention is applied to the surface of the mortar to a thickness of about $1/16$ inch to $1/8$ inch, preferably by spraying. The application of this sealer coating may conveniently be made as shown in FIG. 5, by rotating the pipe 10 on a turntable 40 and spraying it from a slowly rising elevator 42 with a spraygun 44 to which the two components of the coating system are supplied from separate containers 46, 48, and blended in predetermined proportions by an appropriate metering device (not shown).

Following the application of the sealer coating, the pipe is maintained in a dry environment at a temperature above 60° F. until the sealer coating is substantially cured. The pipe can then be exposed to the weather until the cure of the mortar is completed. Although the sealer coating cures substantially in a few hours, full cure of both the coating and mortar to the hardness required for normal field handling takes about four days. The curing time and temperature of the sealer coating may be varied, if necessary, by exposure to a dry or moist heat environment or by adding accelerating materials to the sealer curing agent.

For a mortar-coated steel pipe to resist stray current electrolysis when subjected to voltage gradients in the earth, external surfaces of the pipe must not pick up or discharge an appreciable amount of electric current or allow the intrusion of dissolved corrosive salts such as chlorides. Thus, the pipe protective coating must have relatively high electrical resistance and low permeability.

If a thin dielectric coating is applied over a much thicker mortar coating, the effective electrical resistance of the pipe will depend upon the combined specific resistances of both the mortar and dielectric material. For the purposes of this invention, the dielectric strength may be considered adequate if the combined resistance of the sealer coating and the mortar is on the order of a few thousand ohms per square foot to direct electrical current.

In general, most polyamide cured epoxy resins, moisture-cured urethanes and polysulfides satisfy the sealer coating criteria of this invention. These criteria are best met, however, by epoxies. Among the latter, cycloaliphatic epoxies are generally unsuitable because they usually require a heat cure. Epoxies cured by acid curing agents such as benzene sulfonic acid are unsuitable because the acidity of the curing agent interferes with the hydration of the mortar. In general, however, the liquid vehicle may consist essentially of a material chosen from the group consisting of polysulfides, and bisphenol A-based epoxies.

Room-temperature amido-amine-cured epoxies, however, are suitable and are preferred. In the preferred embodiment of this invention, the epoxy sealer coating is a two-component, essentially solventless epoxy resin system. The two components are, respectively, a liquid vehicle or resin component (46 in FIG. 5), and a liquid curing agent (48 in FIG. 5). The components are separately packaged and are mixed immediately prior to use as in the spray gun 44 (FIG. 5). The spray gun applies the components to the pipe 10 in mixed form, whereupon the system cures *in situ* to form the hard, abrasion-resistant, impervious dielectric coating 38.

The vehicle in the preferred embodiment contains, generally, epoxy resin, a reactive diluent, and pigments, fillers, and thickeners in the following proportions by volume:

Epoxy resin: 75% minimum
Diluent: 15% maximum
Pigments, fillers, and thickeners: 10% maximum The pigmented, thickened resins of the preferred embodiment have been found to provide proper penetration of the mortar by the sealer coating and the best coverage, resulting in increased resistivity of the coating-mortar combination as compared to unpigmented, unthickened resins.

The curing agent consists, basically, of an aliphatic, amido-amine accelerated with a modified aliphatic amine. The use of solvents is not ruled out as such, but if any are used, they must be of such nature that no hydration-jeopardizing solvent is released by the system before, during or after the cure of the system.

The epoxy resin used is preferably a liquid reaction product of epichlorohydrin and bisphenol A, available commercially in diluted form. The resin must not contain any evaporable solvents, as these may penetrate the mortar and affect it deleteriously.

The diluent should be a reactive one such as, e.g. a glycidyl ether derivative. Inert diluents or extenders such as hydrocarbon resins, coal tars, or extender oils may be used, but the use of a reactive diluent results in a stronger, more uniform coating and a better cure.

The pigments and solid fillers used in the vehicle must be essentially chemically pure and inert, and are limited to those which are neither soluble in nor reactive with the other ingredients of the coating, the mortar, or the environment to which the pipe will be subjected. Their primary purpose is to provide opacity, color if desired, and resistance of the coating to degradation from sunlight if the pipe is stored above ground for long periods.

Inasmuch as the necessity of preventing solvent evaporation from the coating prevents thinning of the coating in the field with the usual solvent thinners by the user prior to application, a reactive diluent is used to control viscosity for the contemplated mode of application, e.g. air spray, airless spray, brush, etc. and a thixotropic agent is used to provide proper coverage characteristics.

The choice of a thixotrope is determined by a compromise between flow characteristics (i.e. self-leveling and non-sagging of the sealer coating when applied over a mortar surface with a roughness generally of the same order of magnitude as the thickness of the sealer coating) and temperature stability. Colloidal thixotropic agents excel in the former respect, whereas colloidal pyrogenic silica pigments excel in the latter.

The curing agent can be an aliphatic polyamine, such as diethylenetriamine or triethylenetetramine, a tertiary amine such as dimethylaminomethylphenol or tris - (dimethylaminomethyl)phenol, amido amine, polysulfide, fatty polyamide, or mixtures thereof.

To accelerate the cure, up to a few weight percent of a modified aliphatic amine may be added, or the environmental temperature may be raised by dry or moist heat. Catalytic quantities of unmodified aliphatic polyamines, tertiary amines or phenols such as resorcinol, bisphenol A or nonylphenol can be added to accelerate the cure.

EXAMPLE

A vehicle was prepared with the following formulation:

| | Wt. percent |
|---|---|
| Liquid epoxy resin diluted to about 500 to 700 cp. at 25° C. with glycidyl ether derivative | 81.83 |
| Rutile titanium dioxide (Tioxide RHD4, Tioxide of Canada Ltd.) | 14.70 |
| Green pigment (G 4099, C. K. Williams & Co.) | 1.67 |
| Thixotrope (Thixatrol ST, Baker Castor Oil Co.) | 1.80 |

The vehicle was mixed with a curing agent consisting of a blend of aliphatic amido-amine and modified aliphatic amine, in the ratio of 3.5 to 1 by weight. The mixture was applied with airless spray equipment in the manner depicted in FIG. 5 at a rate on the order of 50 square feet per gallon, with the pipe revolving slowly enough to allow the sealer coating to penetrate the deepest surface irregularities of the mortar.

Following application of the sealer coating, the pipe was removed from the turntable and stored vertically for four days in a warm, dry place. In that time, the coating and mortar were found to have cured sufficiently to allow the pipe to be rolled to the storage yard without damage. The sealer coating was hard and abrasion-resistant, yet sufficiently elastic to stretch across microcracks or other minor imperfections in the mortar without breaking.

After two months of aging, the D.C. electrical resistance of the sealer-mortar combination of this pipe was 4150 ohms per square foot. In terms of volume resistivity, this corresponded to nearly 10,000,000 ohm-cm. as compared to about 15,000 ohm-cm. for the average unsealed cement mortar coating of comparable age.

I claim:

1. A method of protecting steel-containing pipe against corrosion comprising the steps of:

encasing said pipe in a portland cement mortar in a manner whereby a plurality of irregularities are formed on the surface thereof;

covering said mortar while said mortar is still fresh and uncured, in a manner penetrating said surface irregularities, with a solvent-free corrosion-inhibiting material consisting essentially of a liquid vehicle consisting essentially of a material chosen from the group consisting of bisphenol based epoxies and a liquid non-acidic curing agent consisting essentially of a material selected from the group consisting of amido-amines, modified amines, tertiary amines, liquid polysulfides, and mixtures thereof, and curing said material in a manner whereby said resulting cured material is impervious to moisture and electrically non-conductive and chemically non-reactive with the normal hydration of the mortar while sealing any moisture present in the mortar therein.

2. The method of claim 1 wherein the step of curing said material includes the step of curing said material at room temperature.

3. The method of claim 1 further including the step of adding a quantity of a material selected from the group consisting of unmodified aliphatic polyamines, and phenols sufficient to accelerate the normal cure rate of said material to said material prior to covering said mortar therewith.

4. The method of claim 1 wherein the step of covering said mortar with a material includes the step of covering said mortar with a material which is impervious to corrosive chloride salts.

References Cited

UNITED STATES PATENTS

| 2,709,664 | 5/1955 | Evans | 117—75 |
|---|---|---|---|
| 2,901,377 | 8/1959 | Bode | 117—70 R |
| 2,923,643 | 2/1960 | Rodwell | 117—70 C |
| 2,976,256 | 3/1961 | Whittier et al. | 117—123 D X |
| 3,104,982 | 9/1963 | Shanley | 117—70 C |
| 3,275,579 | 9/1966 | Stierli et al. | 117—123 D X |
| 3,447,955 | 6/1969 | Whittenwyler et al. | 117—123 D |
| 3,518,107 | 6/1970 | Millen | 117—123 D X |
| 3,538,184 | 11/1970 | Heer | 117—123 D X |
| 3,556,831 | 1/1971 | Shinabeck et al. | 117—75 X |

RALPH S. KENDALL, Primary Examiner

C. K. WEIFFENBACH, Assistant Examiner

U.S. Cl. X.R.

117—75, 94, 123 D